Feb. 13, 1951      W. T. SAGNER      2,541,295
POWER-OPERATED CARRIAGE RETURN
AND LINE-SPACING DEVICE
Filed May 15, 1948      2 Sheets-Sheet 2
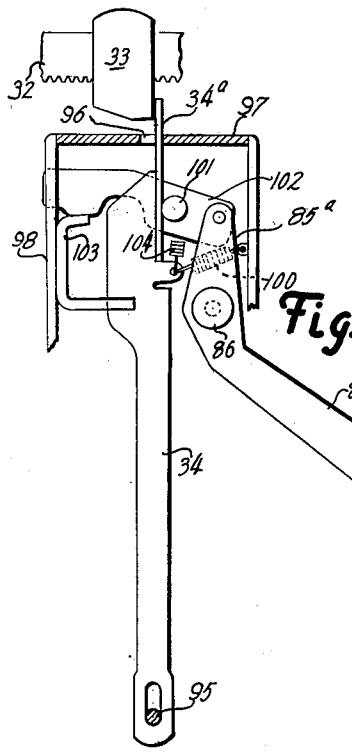
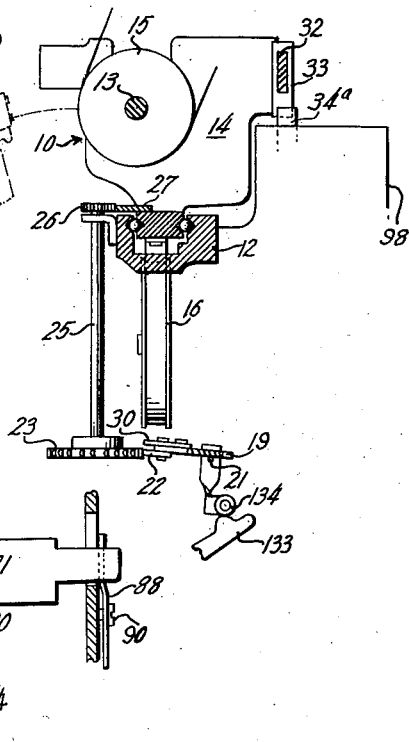
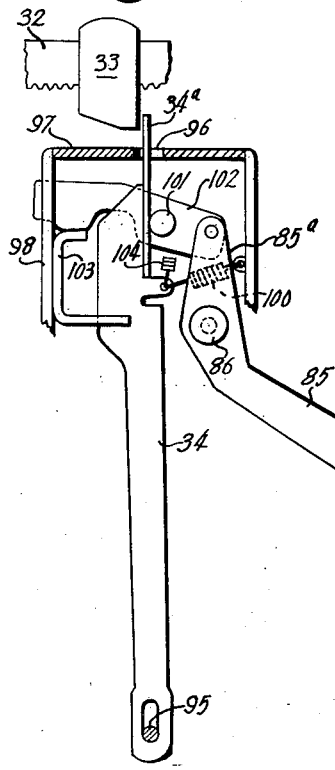
INVENTOR.
WALTER T. SAGNER
BY Jesse A. Holton
ATTORNEY Patented Feb. 13, 1951

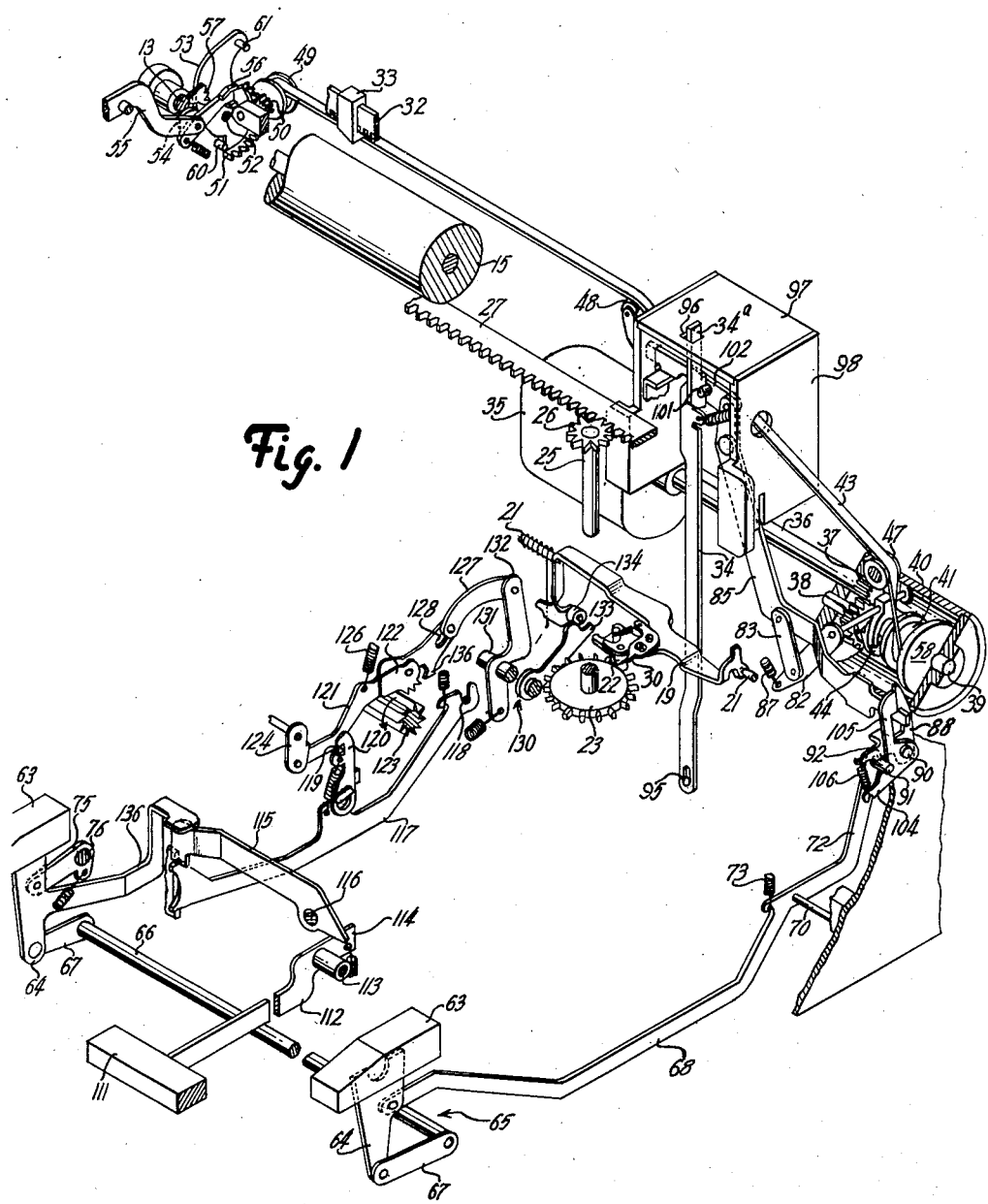

2,541,295

UNITED STATES PATENT OFFICE 2,541,295

POWER-OPERATED CARRIAGE RETURN AND LINE-SPACING DEVICE

Walter Theodore Sagner, West Hartford, Conn., assignor to Underwood Corporation, New York, N. Y., a corporation of Delaware Application May 15, 1948, Serial No. 27,224

2 Claims. (Cl. 197—66)

This invention relates in general to typewriters and other record preparing machines, and more particularly to power devices for operating a line-spacing mechanism and ensuingly returning a carriage.

Many prior devices of this type are operable for line-spacing operation if the carriage is stationed in returned position. However, to provide for this capability the control mechanism has been either of a complex nature, or the carriage feed and related mechanism has been of a design which upon conclusion of a power return of the carriage provided for a great back-lash of the latter, in order to permit the effectuation of the power device subsequently for line-spacing operation in the returned position of the carriage. Resort to a great back-lash is of course undesirable inasmuch as such back-lash is then also present at carriage back-spacing operations and whenever the carriage is being relocated by hand. Moreover, the problem of providing a reliably and efficiently operative power-mechanism for line-spacing in the returned position of the carriage is greatly aggravated in machines of small letter-feed pitch since the escapement must catch the proper escapement wheel tooth each time it takes over the control of the carriage following a carriage return and/or line-spacing operation, and since therefore the back-lash must be appreciably less than one letter-feed space.

It is an object of the invention to provide a power mechanism of the general species hereinabove referred to, which requires few parts, is functionally simple, and does not rely on small movements and thus is reliable in operation.

It is another object of the invention to provide an efficient mechanism for the purpose stated in a machine that embodies a letter-feed controlling mechanism which permits only a small back-lash of the carriage after the power-return action is terminated.

Another object is to provide a mechanism satisfying the stated objects and adding little or no weight to the carriage.

It is a further object of the invention to provide for a momentary carriage advance incidental to the conditioning of the power device for line spacing in the returned position of the carriage, in order that the control mechanism for such power device may be given control movements of sufficient magnitude to provide for reliable functioning.

It is a still further object to employ a power mechanism to impart to the carriage said momentary carriage advance for the purpose stated, employing preferably a mechanism serving also for another purpose.

Having now reference to the drawings—

Figure 1 is a skeleton front perspective view illustrating the invention embodied in a typewriter and indicating portions of the typewriter carriage in an advanced letter-feed position, Figure 2 is a sectional front elevation of a part of the control mechanism for power-returning the carriage and effecting line-spacing operations, a carriage-carried return terminating control element being shown in the position it occupies after termination of a return, Figure 3 is a fractional side elevation showing a typewriter carriage guided upon a frame, together with a conventional letter-feeding mechanism therefor, Figure 4 is a view similar to Figure 2, but depicts the control mechanism in a condition it will transitorily occupy following the institution of a line-spacing operation if such institution is effected while the carriage is stationed in return position.

The invention is illustrated in connection with the All Electric Underwood Typewriter, and some details of the mechanism correspond substantially with those shown in a patent to Helmond, No. 2,262,676, dated November 11, 1941, whereover the invention constitutes an improvement.

Directing now attention to Figure 3, a paper-supporting carriage 10 is guided for letter-feed and return movements upon a trackway 12 which forms part of a machine framework. The carriage has spaced end plates 14 wherein a record-supporting platen 15, by means of a shaft 13, is turnably supported. A spring motor 16 having a usual flexible band connection with the carriage 10 urges the latter constantly in letter-feed direction, that is leftwardly as seen from the front of the machine. The carriage is allowed to letter-feed under the influence of said spring motor at each actuation of an escapement mechanism comprising a rocker 19 pivoted at opposite ends upon pintles 21. Said rocker 19 carries a usual holding dog 22 which is normally engaged by a tooth of an escapement wheel 23 to detain the carriage in a letter-feed position. Said wheel 23 is carried on a vertical shaft 25 which also carries a pinion 26 in mesh with a rack 27 that has support upon and extends lengthwise of the carriage 10 between its ends. The wheel shaft 25 is journalled in the framework of the machine. The escapement rocker 19 carries another dog 30 which transitorily during operation of the escapement rocker in clockwise direction as seen from the right of the machine, will be in control over the escapement wheel 23 to assure that no more than a single feed step takes place. The described escapement is of a conventional design providing for rapid letter-feeding of the carriage incidental to each typing operation or an operation of a usual space bar 111. The holding dog 22 is mounted on the rocker 19 and spring influenced to flex out of the way whenever the carriage is given a movement in return direction, ready to enter behind any escapement tooth that has ratcheted past it.

At the rear of the carriage, upon the ends 14 thereof, see Figures 1 and 3, there is supported a rack 32, along which there are adjustably supported a left and a right margin stop, the drawings showing only a left margin stop 33, which, it will be seen, constitutes a control element for opening the power-return drive of the carriage automatically at the appropriate time. Said control element 33, as well as the right margin stop, not shown, cooperates with an upper end 34ᵃ of a counterstop arm 34 to determine therewith the limits of carriage travel, said element 33 in conjunction with said arm 34 having additionally the function to ineffectuate the power-return drive in a manner to be described later.

Preferably while the machine is in use, a frame-supported electric motor 35 at the rear of the machine, see Figure 1, continuously drives a shaft 36 having at its right end a pinion 37 in engagement with a gear 38 carried on a spindle 39. The pinion end of the shaft 36 has a bearing in a casing 40 which also affords bearings for the opposite ends of the spindle 39. A drum 41 carried on the spindle 39 normally rotatively independently thereof, has a draw-band 43 attached thereto in a manner to be wound thereon when the pulley is rotated anticlockwise of Figure 1. Said gear 38, see also Figures 2 and 4, has clutch teeth 42 projecting from the right thereof, and the drum 41 has splined thereto, in a manner not shown, for rotation therewith on the spindle, a clutch collar 44 provided with clutch teeth 45 that are normally separated from the clutch teeth 42 of the gear 38. To cause power-rotation of the drum 41, the collar is shifted leftwardly to the position seen in Figure 4, thereby to provide a closed drive connection across the clutch teeth 42, 45, the controlling structure for this being described later herein.

As shown in Figure 1, said draw-band 43 passes over frame-supported guide pulleys 47, 48 onto a drum 49 journalled on the left carriage end 14, and has an end attached to and wound thereabout so that a rightward pull on the band will rotate it clockwise. A beveled pinion 50 unitarily rotatable with the drum 49 meshes with a bevel gear sector 51 pivotally carried upon the adjacent carriage end 14, as at 52. Said sector 51 is integral with a cam 53 which through the medium of a roll 54 is adapted to act on a spring-returned line-space lever 55 that carries a line-space pawl 56 for engagement in a usual toothed line-space wheel indicated at 57 and fast on the platen shaft 15. It will be seen that if the clutch collar 44 is moved to the position shown in Figure 4, wherein the clutch teeth 42, 45 are in mesh, that the draw-band 43 will be wound upon the pulley 41 and that therefore the pulley 49 will be actuated resulting in the actuation of the just described line-spacing device. The draw-band 43 is kept taut by a spring in a barrel 58 which tends to turn the drum 41 constantly in winding direction. A relatively stronger spring, not shown, draws the gear sector 51 normally against a stop 60 so that the various parts of the line-spacing device are positioned as shown in Figure 1. A pin 61 carried on the line-space cam 53, in conjunction with a part on the carriage, limits the operation of the line-spacing device, wherefore after the line-spacing operation has taken place, in consequence of a closure of the clutch 42, 45, the carriage ensuingly is power-driven in return direction.

Closure of the drive clutch 42, 45 may be effected by depression of either one of two carriage return keys 63 which flank the keyboard of the machine. These keys are mounted upon vertical stems 64 which are connected for operation of either one with the other through a bail structure 65 comprising a pivoted shaft 66 and two widely spaced arms 67, the latter having each a pivotal connection with one of the stems 64. The key stem 64 of the return key 63 at the right is additionally connected to a rearwardly reaching lever 68 having a fulcrum at 70. A spring 73 serves to restore the lever 68 upwardly to a normal position seen in Figure 1, against a stop, not shown. The key stem 64 for the key 63 at the right is vertically guided by the lever 68 and the bail arm 67. Vertical guidance of the key stem 64 at the left is provided by the bail arm 67 and an arm 75 pivoted in the machine at 76.

The clutch collar 44 is shiftable into and out of closed clutch position by a fork 80 operating in an annular groove 79 thereof and carried on a shaft 81 having pivotal support in the casing 40. On the forward end of the shaft 81 there is mounted an arm 82 which has a connection, as by a link 83, with a clutch control lever 85. The latter is pivoted at 86 and a spring 87 connected to the arm 82 constantly urges the fork 80 toward the closed clutch position seen in Figure 4. Normally, however, a primary latch 88, pivotally supported in the right side wall of the machine, as at 90, keeps the lever 85, against the tension of the spring 87, in its clockwise-turned, open-clutch position seen in Figures 1 and 2. The latch 88 is releasable by operation of either of said carriage return keys 63, and to this end a rearwardly extending arm 72 of the lever 68 has a pin 91, see Figure 1, underlying a forwardly reaching arm 92 of the latch 88. Upon operation of either key 63, said pin 91 displaces said latch 88 pivotally in a clockwise direction as viewed in Figure 1, thereby to free the lever 85 for clutch closing movement under tension of the spring 87 to the position illustrated in Figure 4. This renders the carriage return and line-spacing drive active.

At the conclusion of each carriage returning operation the clutch 42, 45 is automatically opened through a swinging displacement of the counterstop arm 34 rightwardly by the carriage return terminating margin stop 33. Said counterstop arm 34 for this purpose is mounted to swing about its lower end on a pivot pin 95, and at its upper end has capacity for a limited swinging movement in the direction in which the carriage extends by reaching through a perforation 96 in a plate 97. This plate is the top side of a housing 98 forming part of the framework of the machine. The connection between the counterstop arm 34 and the control lever 85 consists of a link 102 extending leftwardly from an upreaching arm 85ᵃ of the lever 85, the link having a pin 101 contacting with the counterstop arm 34. Normally the arm 34 is in the position shown in Figures 1 and 2, but in the closed clutch position of the lever 85 it will assume the position seen in Figure 4. Incidental to its rightward displacement by the margin stop 33 the counterstop arm 34 will displace the lever 85 a little beyond the open clutch position of Figure 2 for the latch 88 to resume control. The link 102 is guided near its left end in the housing 98 and also rests on a shelf 103.

A spring 100 relatively lighter than the spring 87 tends to keep the counterstop arm 34 in contact with the pin 101. The counterstop arm 34 has also an upwardly acting spring 104 associated therewith to keep its upper end 34ª normally in cooperative range of the margin stops, the counterstop arm at the location of the pivot pin 95 having a slot permitting it to be lowered below the range of the margin stops, in a conventional manner, for typing beyond the regularly established margins.

Pivoted on the same pivot as the latch 88 is a secondary latch 105 normally clear of the front side of the lever 85 and having a latch shoulder a little lower than the latch shoulder of the latch 88. This secondary latch 105 has an arm 104 reaching forwardly under and contacting normally the pin 91 under the tension of a contractile spring 106 provided between the latch arms 92 and 104. When the primary latch 88 is operated, as hereinbefore described, by operation of either one of the carriage return keys, the secondary latch is temporarily capacitated under the tension of the spring 106 to hold the lever 85 as it moves to open clutch position and in the event the carriage returning operation is concluded before the operator has released carriage return key 63. In any event, following release of the operated carriage return key, and at the end of the power return of the carriage, the primary latch 88 will always have reassumed control over the lever 85, under the tension of the spring 106, to hold it in open-clutch position.

Referring now specifically to Figure 1, the machine of the invention includes a space bar 111 for operating the aforedescribed escapement rocker 19 and thereby to cause the carriage 10 to feed a letter-feed increment. Preferably such operation is effected through the intermediary of a power device presently to be described and of conventional design.

The space bar 111 is mounted upon the front end of a structure which includes a lever 112 pivotally carried on a shaft 113, the lever having an arm 114 for imparting an anticlockwise rocking movement to a transversely disposed lever 115. The latter is pivoted at 116 and at the left overlies a rearwardly extending lever 117 having pivotal support at 118 in the machine. Reaching upwardly from the lever 117 is an element 120 which has a hook normally overlying a lug 119 on a power link 121. Operation of the space bar 111 results in a downward displacement of the power link 121 to connect transitorily a snatch pawl 122 thereof with a fluted power shaft 123 that is constantly turning. Said power link is connected at the front to a pendant guide arm 124 and at a point rearward thereof has a spring 126 connected thereto to urge it rearwardly and upwardly against an abutment, not shown, so that the snatch pawl 122 is normally barely clear of the fluted power shaft. At the rear the power link 121 has connected thereto, by means of a pin-and-slot connection 128, a pull-link 127, the latter being communicative with a pivoted bail structure 130 comprising a shaft 131, an arm 132 to which the link 127 is connected at the left side of the machine, and a rearwardly reaching arm 133 near the escapement. Operation of the bail about the shaft axis in an anticlockwise sense causes a cam-face on the arm 133 to act on a roller 134 to impart a rocking movement to the escapement rocker 19. It will now be seen that operation of the space bar 111 causes a transitory forward actuation of the power link 121, a consequent actuation of the bail structure 130, and an operation of the escapement 19, 22 and 30 to feed the carriage one-letter-feed increment. The snatch pawl 122 of the power link is forced out of engagement with the fluted shaft automatically as the escapement becomes actuated. This is by reason of a nose 136 on the actuator link 121 moving into the orbit of the teeth on the fluted shaft. After the power link is forced upwardly, it will return to normal position under the urge of the spring 126. Should the space key still be held operated at this time, there will not ensue a second power operation, but the hook element 120 will temporarily be displaced rearwardly by the lug 119 on the power link 121 without any engaging effect on the snatch pawl 122.

According to the invention a momentary carriage advance will ensue in immediate response to the operation of the carriage return keys 63. To this end the key stem 64 of the carriage return key at the left side of the keyboard is provided with a rearwardly extending branch 136 which has a lip overlying the lever 115 of the space-key controlled mechanism. Therefore, upon operation of either of the carriage return keys 63, the levers 115, 117 will become operated with the result that the escapement receives a momentary power actuation, and that the carriage will consequently execute a step-movement in advance direction. Toward the end of the down stroke of the operated key 63, the clutch controlling latch 88 releases the lever 85 for clutch closing movement under the power of the spring 87.

It will now be seen that if a return key 63 is operated to institute a line-spacing action in the return position of the carriage, namely while the return terminating margin stop 33 is virtually in contact with the counterstop end 34ª, as illustrated in Figure 2, the margin stop 33 will advance out of the way of the counterstop end 34ª to make room for the control lever 85 to execute a large and adequate clutch closing movement. This is illustrated clearly in Figure 4 wherein the margin stop has moved one letter-feed step from extreme return position, and wherein the clutch controlling mechanism is shown to have moved to fully closed clutch position.

Inasmuch as the clutch 42, 45 is enabled to close fully and reliably, it follows also that there will ensue a reliable line-spacing action, and that this line-spacing action will be followed by a movement of the carriage in return direction which will cause the margin stop 33 to impart a large and reliable clutch opening movement to the counterstop 34 and the parts leading to the carriage return clutch, it being understood that such movement ensues after the line-spacing mechanism has been actuated.

The advance movement of the carriage results in response to every operation of a return key 63, regardless of whether or not the carriage is in returned position. Obviously when the carriage is not in returned position there is no necessity for the institution of a letter-feed movement, but no harm comes thereof.

What is claimed is:

1. In a record making machine having a carriage movable on a frame, means comprising an escapement for letter-feeding the carriage, a line spacer on the carriage limitedly operable to line space record material, power means, normally idle actuator means operatively associated with said line spacer for operating the same and ensuingly returning the carriage to a predetermined position, means including a part displaceable from a normal to a displaced position to connect said actuator means for operation by said power means, and restorable to normal position to disconnect said actuator means, a key, means responsive to said key to displace said displaceable means including said part, means on the carriage engageable with said part by movement of the carriage to said predetermined position to restore said displaceable means and therefore to disconnect said actuator means from the power means, said escapement holding the carriage upon its return in a position blocking movement of said part to said displaced position, and means additionally responsive to said key to operate said escapement for a letter-feed movement and thereby to provide space for movement of said part to said displaced position, wherefore said key is operable in the returned position of the carriage for operation of the line spacer.

2. In a record making machine having a carriage movable on a frame, means comprising an escapement operable to letter-feed the carriage, normally inactive means to power-operate said escapement, a line spacer limitedly operable on the carriage to effect line spacing of record material, power means, normally idle actuator means operatively associated with said line spacer for limitedly actuating the same and ensuingly returning the carriage to a predetermined position, means including a part displaceable from a normal position to connect said actuator means to said power means for operation thereby, and restorable to normal position to disconnect said actuator means from said power means, a key, means responsive to said key to displace said displaceable means including said part, means on the carriage engageable with said part by movement of the carriage to said predetermined position to restore said displaceable means and therefore to disconnect said actuator means, and means responsive to said key to render said escapement power-operating means active for effecting a single advance movement of the carriage and thereby to provide space for said part to move to displaced position in the event it is desired to operate the line spacer while the carriage is stationed in returned position.

WALTER THEODORE SAGNER.

REFERENCES CITED

The following references are of record in the file of this patent:

UNITED STATES PATENTS

| Number | Name | Date |
|---|---|---|
| 1,784,047 | Degener | Dec. 9, 1930 |